United States Patent
St. Jean

(10) Patent No.: US 9,399,424 B2
(45) Date of Patent: Jul. 26, 2016

(54) SAFETY STRAP FOR TRUCK TAILGATE RAMPS

(71) Applicant: Stephen St. Jean, Otonabee (CA)

(72) Inventor: Stephen St. Jean, Otonabee (CA)

( * ) Notice: Subject to any disclaimer, the term of this patent is extended or adjusted under 35 U.S.C. 154(b) by 312 days.

(21) Appl. No.: 14/143,029

(22) Filed: Dec. 30, 2013

(65) Prior Publication Data

US 2014/0182087 A1 Jul. 3, 2014

Related U.S. Application Data

(60) Provisional application No. 61/748,146, filed on Jan. 2, 2013.

(51) Int. Cl.
*B60P 7/08* (2006.01)
*B60P 1/43* (2006.01)

(52) U.S. Cl.
CPC ............... *B60P 7/0823* (2013.01); *B60P 1/435* (2013.01); *Y10T 24/31* (2015.01); *Y10T 24/318* (2015.01)

(58) Field of Classification Search
CPC ..... B60P 7/0823; B60P 1/435; Y10T 24/318; B65G 69/30
See application file for complete search history.

(56) References Cited

U.S. PATENT DOCUMENTS

| 3,510,015 | A | | 5/1970 | Roshaven | |
|---|---|---|---|---|---|
| 4,098,414 | A | * | 7/1978 | Abiera | B60P 1/435 193/5 |
| 4,478,549 | A | * | 10/1984 | Stelly | B65G 69/30 182/104 |
| 4,571,144 | A | * | 2/1986 | Guidry | B60P 1/435 182/157 |
| 5,768,733 | A | | 6/1998 | Kneebone | |
| 5,853,281 | A | * | 12/1998 | Farmer | B65G 69/30 193/35 R |
| 6,267,082 | B1 | | 7/2001 | Naragon et al. | |
| 6,837,669 | B2 | | 1/2005 | Reed et al. | |
| 7,350,843 | B2 | | 4/2008 | Meyers et al. | |
| 7,661,171 | B2 | * | 2/2010 | Gang | B65G 69/30 14/69.5 |
| 7,810,196 | B1 | | 10/2010 | Pritchard et al. | |
| 2003/0039534 | A1 | | 2/2003 | Radosevich | |
| 2003/0072641 | A1 | | 4/2003 | Reed | |
| 2004/0083562 | A1 | | 5/2004 | Leblanc | |

* cited by examiner

*Primary Examiner* — Robert J Sandy
(74) *Attorney, Agent, or Firm* — Buckingham, Doolittle & Burroughs, LLC

(57) ABSTRACT

A safety strap device that reduces the likelihood that a tailgate ramp will prematurely detach or disengage from a vehicle during the loading or unloading of an article via the tailgate ramp. The safety strap device includes -a strap portion with a first end, an opposing second end, a block portion with an opening therein and more than one fastener for attaching the strap portion to both a prior art tailgate ramp on one end and the block portion on the other end. The safety strap device may also be adjustable to accommodate a wide variety or user applications, truck ramps and vehicles.

16 Claims, 4 Drawing Sheets

SAFETY STRAP FOR TRUCK TAILGATE RAMPS

CROSS-REFERENCE

This application claims priority from Provisional Patent Application Ser. No. 61/748,146 filed on Jan. 2, 2013.

FIELD OF THE INVENTION

This invention relates to a safety strap device for temporarily securing a tailgate ramp to a tailgate of a vehicle, such as a pickup truck. The unique design of the safety strap device reduces the likelihood that the tailgate ramp will prematurely disengage from the tailgate.

BACKGROUND

Many individuals own vehicles such as trucks with beds, and use said vehicles to haul or transport articles, such as all terrain vehicles, motorcycles, tractors, lawnmowers, and virtually any other type of article that will fit in a truck bed. However, one difficulty in transporting such articles is loading and/or unloading the article into the elevated truck bed, which can be both time-consuming and dangerous.

One device known in the art for assisting an individual to load and/or unload an article into a truck bed is a tailgate ramp. Most tailgate ramps extend at an angle between the ground surface and the elevated tailgate, and are useful for driving or pushing an article from the ground surface, up the tailgate ramp, and into the truck bed. Likewise, the tailgate ramp may also be used to assist an individual to drive or push an article from the truck bed (or other elevated surface), down the tailgate ramp, and onto the ground surface.

Notwithstanding the above stated benefits of tailgate ramps, one problem commonly associated with the use of a tailgate ramp is the tendency of the ramp to prematurely detach from the vehicle during the loading and/or unloading of the article, which can be dangerous and cause serious injury to the user and significant damage to the article being loaded/unloaded and/or the vehicle.

Consequently, there exists in the art a long-felt need for a safety strap device that can be used to temporarily, but securely, attach a prior art tailgate ramp to a vehicle, such as a pickup truck with a tailgate. There also exists in the art a long felt need for a safety strap device that is adjustable to accommodate a wide variety of tail gate ramps, vehicles and possible applications. Finally, there is a long-felt need for a safety strap device that accomplishes all of the forgoing objectives and that is relatively inexpensive to manufacture, and safe and easy to use.

The present invention provides vehicle owners (e.g., pickup truck owners) with a quick and safe way to mount and secure tailgate ramps to a tailgate, and reduces the likelihood that the ramps will prematurely detach from the tailgate during use. The present invention also reduces the amount of time it takes to set up the tailgate ramps, and the likelihood that the safety strap device will be misplaced or lost when not in use.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, is a safety strap device that reduces the likelihood that a tailgate ramp will prematurely detach or disengage from a vehicle (e.g., during the loading or unloading of an article via the tailgate ramp), which can be dangerous and result in serious injury or death to the user, as well as significant property damage to the vehicle and/or article being loaded/unloaded. In a preferred embodiment of the present invention, the safety strap device comprises a strap portion with a first end, an opposing second end, a block portion with an opening therein and more than one fastener for attaching said strap portion to both the prior art tailgate ramp on one end and the block portion on the other end. In a further preferred embodiment of the present invention, said safety strap device is adjustable to accommodate a wide variety of user applications, truck ramps and vehicles. Finally, the safety strap device is relatively inexpensive to manufacture, and safe and easy to use.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
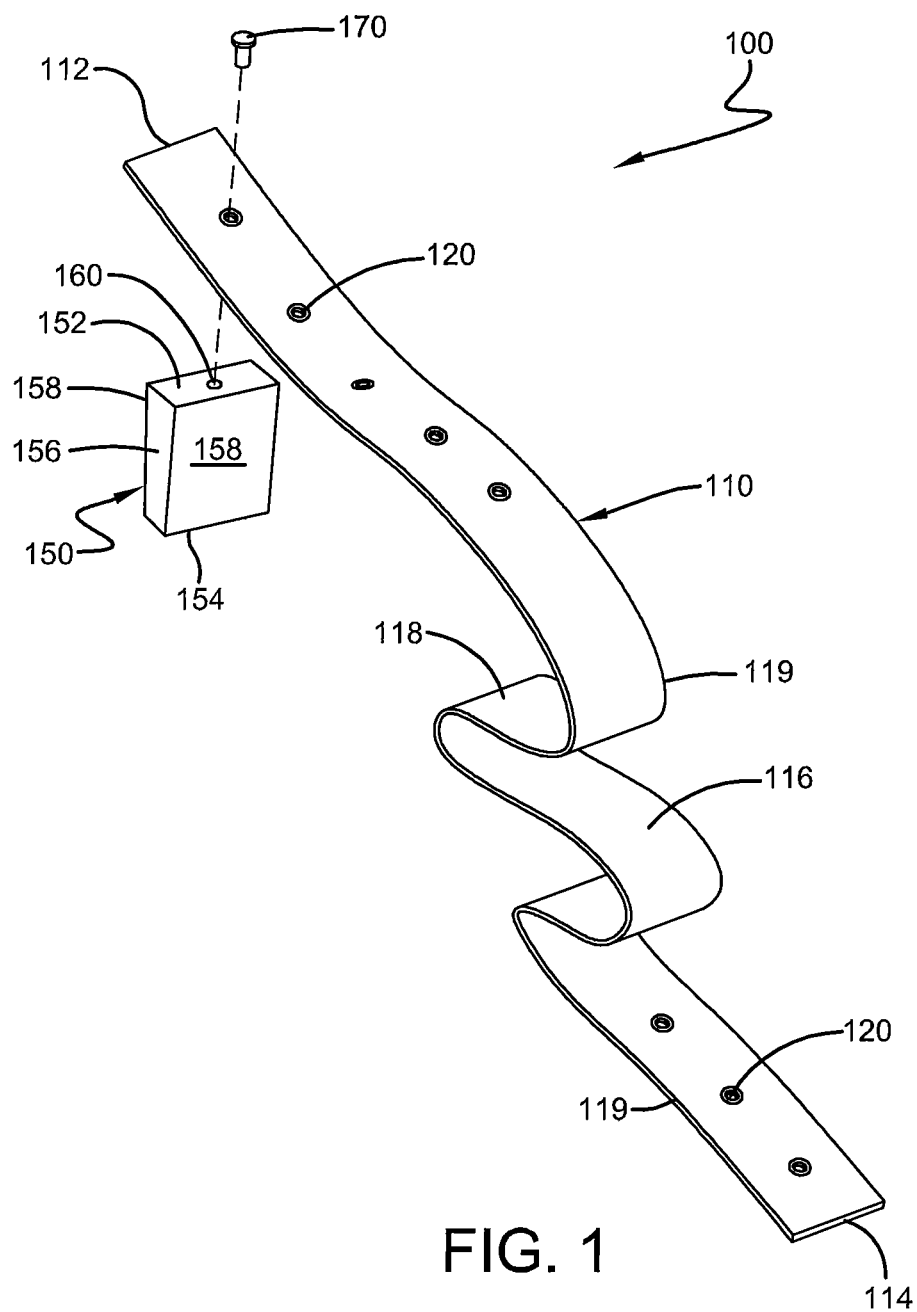
FIG. 1 illustrates a perspective view of the safety strap device of the present invention.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details.

Referring initially to the drawings, FIG. 1 illustrates a perspective view of the safety strap device 100 of the present invention. Safety strap device 100 is preferably comprised of a strap portion 110, a block portion 150 and at least one fastener 170. Strap portion 110 is an elongated strip of material comprised of a first end 112, a second end 114, a top surface 116, a bottom surface 118 and opposing side portions 119. Strap portion 110 is preferably comprised of nylon, though it is contemplated that other durable materials such as cloth, polypropylene and the like could also be used. In a preferred embodiment of the present invention, the overall length of strap portion 110, as measured between first end 112 and second end 114, is preferably between 30 and 38 inches, the overall width of strap portion 110, as measured between opposing sides 119, is preferably between 1¾ and 2¼ inches, and the overall thickness of strap portion 110, as measured between top surface 116 and bottom surface 118, is preferably between ¹⁄₁₆ and ¼ of an inch. Nonetheless, it is contemplated that other sizes and dimensions could also be used to suit user preference or a particular application without affecting the overall concept of the present invention.

Strap portion 110 further comprises a plurality of spaced apart continuous openings 120 therein. Each of continuous openings 120 is preferably between ³⁄₁₆ and ⁵⁄₁₆ of an inch in diameter, and extends between top surface 116 and bottom surface 118. In a preferred embodiment of the present invention, strap portion 110 is comprised of between four and six continuous openings 120 spaced apart at approximately 1 to 1½ inch intervals near first end 112, and an additional four to six continuous openings 120 spaced apart at approximately 1 to 1½ inch intervals near second end 114. Of course, it is also contemplated that a greater or lesser number of continuous openings 120 may be located along strap portion 110, and at equal or varying intervals, to suit user preference and/or a particular application. Continuous openings 120 may also be reinforced by any means commonly known in the art (e.g., with a metal ring positioned along the circumference of the opening) to add additional strength to continuous openings 120 and safety strap device 100.

As best illustrated in FIG. 1, block portion 150 is a generally rectangular structure comprised of a top 152, a bottom 154, opposing sides 156, an inboard surface 158 and an outboard surface 159. In a preferred embodiment of the present invention, the overall height of block portion 150, as measured between top 152 and bottom 154, is preferably between 2½ and 3½ inches, the overall width of block portion 150, as measured between opposing sides 156, is preferably between 1¾ and 2¼ inches, and the overall thickness of block portion 150, as measured between inboard surface 158 and outboard surface 159 is preferably between ½ and one inch. Nonetheless, it is contemplated that other sizes and dimensions could also be used to suit user preference or a particular application without affecting the overall concept of the present invention. Top 152 of block portion 150 further comprises a threaded opening 160 therein for receipt of fastener 170, as described more fully below. Block portion 150 is preferably comprised of a durable material such as plastic, though it is contemplated that other materials, such as rubber, wood and the like, could also be used without affecting the overall concept of the present invention.

Figure 2:
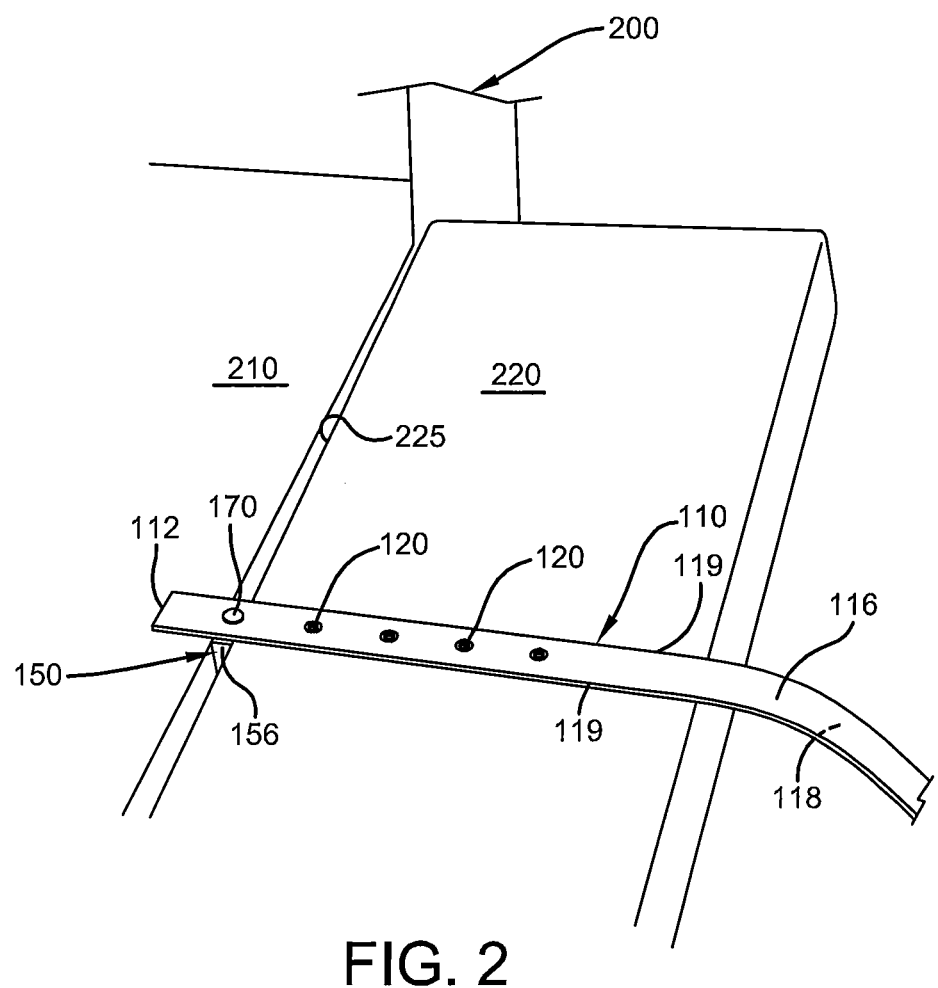
FIG. 2 illustrates a partial perspective view of one end of the safety strap device of the present invention attached to a portion of a prior art tailgate/truck bed.

FIG. 2 illustrates a partial perspective view of safety strap device 100 of the present invention attached to a prior art vehicle 200. More specifically, prior art vehicle 200 is comprised of a truck bed 210, a tailgate 220 and a gap or opening 225 that exists between truck bed 210 and tailgate 220 when tailgate 220 is in an open position, as shown in FIG. 2. To properly install safety strap device 100 onto vehicle 200, a user (not shown) will insert block 150 into gap 225 such that outboard surface 159 faces in the general direction of tailgate 220 and opening 160 is visible and accessible to the user atop block portion 150. The user would then insert fastener 170 through a selectable one of continuous openings 120 located near first end 112 of strap portion 110 and into threaded opening 160. Fastener 170 can be any type of fastener commonly known in the art for fastening two objects together, such as a threaded bolt. In this manner, first end 112 of strap portion 110 may be removably attached to vehicle 200.

Figure 3:
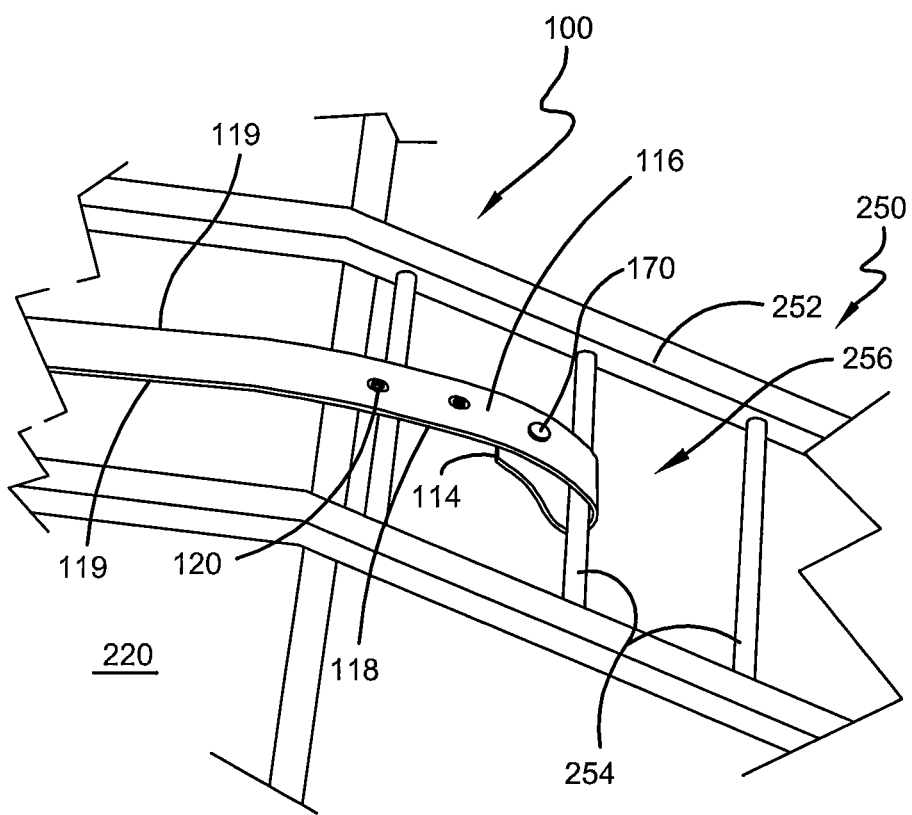
FIG. 3 illustrates a perspective view of an opposite end of the safety strap device of the present invention shown in FIG. 2 attached to a prior art tailgate ramp rung.

FIG. 3 illustrates a partial perspective view of an opposite end of the safety strap device of the present invention attached to a prior art tailgate ramp 250. Prior art tailgate ramps 250 are well known in the art and are typically comprised of two spaced apart rails 252 connected to one another by a plurality of spaced apart rungs 254, as best illustrated in FIG. 3, or a continuous plank (not shown). To properly install safety strap device 100 onto prior art tailgate ramp 250, a user (not shown) may install an opening 256 in a select one or more of rungs 254 for receipt of a fastener 170. The user would then insert a fastener 170 through a selectable one of continuous openings 120 located near second end 114 of strap portion 110 and into opening 256 in prior art ramp rung 254. Alternatively, and as shown in FIG. 3, second end 114 of strap portion 110 may be wrapped around a ramp rung 254 and fastened with fastener 170. As previously mentioned, fastener 170 can be any type of fastener commonly known in the art for fastening two objects together, such as a threaded bolt, and opening 256 is preferably also threaded to accommodate fastener 170. In this manner, second end 114 of strap portion 110 may be removably attached to a prior art tailgate ramp 250.

Figure 4:
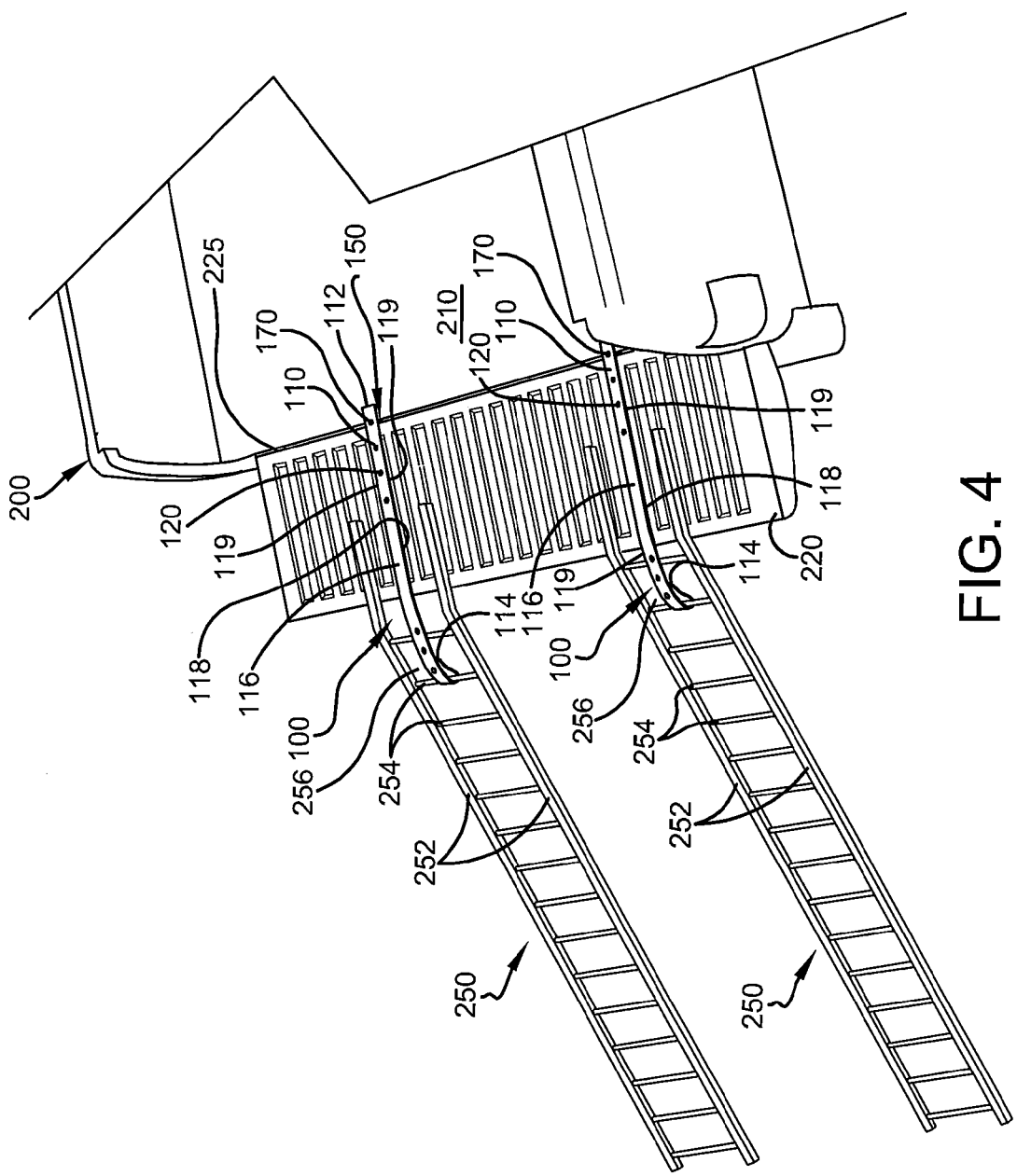
FIG. 4 illustrates a perspective view of the safety strap device of the present invention attached to a prior art vehicle and a prior art tailgate ramp.

Having now described the overall structure of safety strap device 100, the use and usefulness of the same will now be summarized. FIG. 4 illustrates a perspective view of safety strap device 100 of the present invention attached to both a prior art vehicle 200 on the one end and to a prior art tailgate ramp 250 on the opposite end. As explained more fully below, safety strap device 100 significantly reduces the likelihood that tailgate ramp 250 will prematurely detach or disengage from vehicle 200 during the loading or unloading of an article via tailgate ramp 250. The premature detachment of tailgate ramp 250 from vehicle 200 during the loading/unloading process can result in serious injury or death to the user, and significant damage to the article being loaded/unloaded, the vehicle and/or the tailgate ramps, all of which is highly undesirable.

More specifically, safety strap device 100 is attached to a vehicle 200 by inserting block portion 150 into gap 225, and removably attaching first end 112 of strap portion 110 to said block portion 150 by inserting a first fastener 170 through a selectable one of continuous openings 120 located near first end 112 of strap portion 110 and into threaded opening 160 of block portion 150. Because a user (not shown) has multiple continuous openings 120 to select from, safety strap device 100 is adjustable and capable of accommodating a wide variety of truck bed/tailgate combinations and applications. Once safety strap device 100 is securely attached to vehicle 200, further lateral movement of strap portion 110 in the direction of tailgate ramp 250 is prohibited by block portion 150, which is wedged in gap 225 between truck bed 210 and tailgate 220.

In a similar fashion, a user (not shown) may temporarily attach the second end 114 of strap portion 110 to a prior art tailgate ramp 250 by inserting a second fastener 170 through a selectable one of continuous openings 120 located near second end 114 of strap portion 110 and into opening 256 in prior art ramp rung 254. When attaching safety strap device 100 to tailgate ramp 250, the user should eliminate as much slack as possible in the length of strap portion 110 between the fastener 170 used to connect the device 100 to the vehicle 200 and the fastener 170 used to connect the opposite end of device 100 to prior art tailgate ramp 250. Of course, safety strap device 100 could also be installed by first installing the second end 114 of strap portion 110 to prior art tailgate ramp 250, and then installing block portion 150 into gap 225 and attaching first end 112 of strap portion 110 thereto in the manner described above. Further, once an article (not shown) has been successfully loaded/unloaded into or from vehicle 200, a user can quickly remove safety strap device 100 from the vehicle 200 and prior art tailgate ramps by removing each of fasteners 170, and removing block portion 150 from gap

225. Alternatively, the user may elect to keep the safety strap device 100 attached to prior art tailgate ramp 250 to reduce the likelihood that device 100 will become lost or misplaced when not in use. In a similar fashion, the user may also elect to leave block portion 150 attached to first end 112 of strap portion 110 via fastener 170.

Consequently, the various embodiments of safety strap device 100 of the present invention described herein are useful for reducing the likelihood that a tailgate ramp 250 will prematurely detach or disengage from vehicle 200 during the loading or unloading of an article via tailgate ramp 250. The safety strap device 100 of the present invention is also adjustable to suit a wide variety of tailgate/tailgate ramp combinations and applications. Finally, safety strap device 100 is relatively inexpensive to manufacture, and safe and easy to use.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A safety strap device comprising:
    a strap portion having a first end and a second end;
    a block portion; and
    a first fastener for securing the strap portion to said block portion, wherein said first end of said strap portion further comprises a first plurality of spaced apart openings therein.

2. The safety strap device of claim 1 further comprising a second fastener for securing said strap portion to a tailgate ramp.

3. The safety strap device of claim 1 wherein said strap portion further comprises a plurality of spaced apart openings therein.

4. The safety strap device of claim 3 wherein the distance between each of said plurality of spaced apart openings is between 1 and 1½ inches.

5. The safety strap device of claim 1 wherein said second end of said strap portion further comprises a second plurality of spaced apart openings therein.

6. The safety strap device of claim 1 wherein said block portion is inserted into a gap created between a vehicle bed and a vehicle tailgate.

7. The safety strap device of claim 1 wherein said strap portion is adjustable in length.

8. A safety strap device for attaching a tailgate ramp to a vehicle comprising:
    a strap portion having a first end and a second end;
    a block portion, wherein said block portion is positioned in a gap created between a vehicle bed and a vehicle tailgate;
    a first fastener for securing the first end of said strap portion to said block portion; and
    a second fastener for securing the second end of said strap portion to said tailgate ramp, wherein said first end of said strap portion further comprises a first plurality of spaced apart openings therein.

9. The safety strap device of claim 8 wherein said strap portion further comprises a plurality of spaced apart openings therein.

10. The safety strap device of claim 9 wherein the distance between each of said plurality of spaced apart openings is between 1 and 1½ inches.

11. The safety strap device of claim 9 wherein at least one of said plurality of spaced apart openings is reinforced.

12. The safety strap device of claim 8 wherein said second end of said strap portion further comprises a second plurality of spaced apart openings therein.

13. The safety strap device of claim 12 wherein said strap portion is adjustable in length by inserting said first fastener into a select one of said first plurality of spaced apart openings and by further inserting said second fastener into a select one of said second plurality of spaced apart openings.

14. The safety strap device of claim 8 wherein said strap portion is adjustable in length.

15. A safety strap device for attaching a tailgate ramp to a vehicle comprising:
    a strap portion having a first end and a second end, wherein said strap portion further comprises a plurality of spaced apart openings therein and further wherein the distance between each of said plurality of spaced apart openings is between 1 and 1½ inches and wherein at least one of said plurality of spaced apart openings is reinforced with a ring;
    a block portion that can be removably attached to said first end with a first fastener; and
    wherein said second end of said strap portion can be removably attached to said tailgate ramp with a second fastener.

16. The safety strap device of claim 15 wherein said strap portion is adjustable in length.

\* \* \* \* \*